Figure 1:
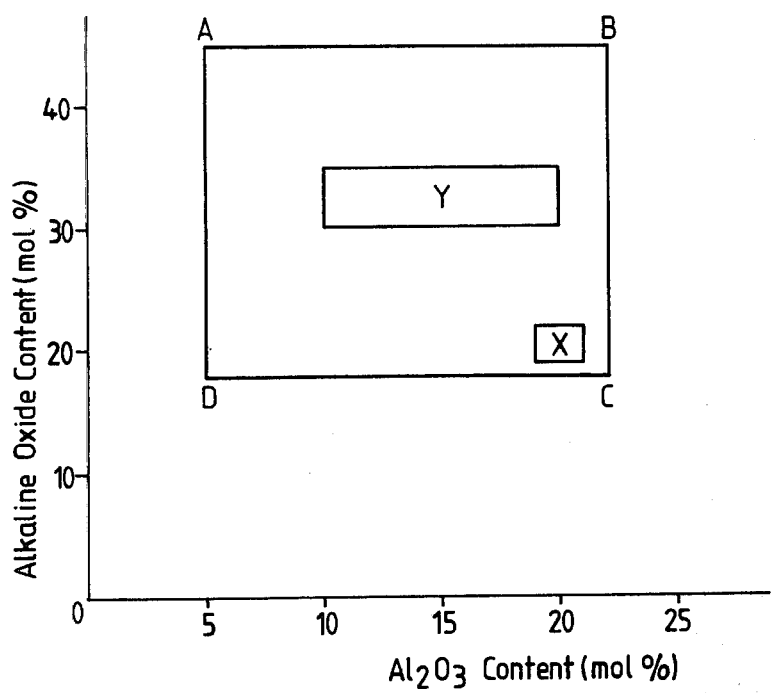

United States Patent [19]

Skedgell

[11] 4,358,544

[45] Nov. 9, 1982

[54] SINGLE PHASE GLASS COMPOSITIONS FOR USE IN PROTECTIVE AND LUBRICATING COATINGS FOR THE HEAT TREATMENT AND HOT WORKING OF METALS

[75] Inventor: Anthony N. Skedgell, Sutton Coldfield, England

[73] Assignee: Daniel Doncaster & Sons Limited, Sheffield, England

[21] Appl. No.: 279,539

[22] Filed: Jul. 1, 1981

[30] Foreign Application Priority Data

Jul. 4, 1980 [GB] United Kingdom ............... 8021976

[51] Int. Cl.³ .................. B21B 45/02; C03C 3/08
[52] U.S. Cl. ............................ 501/77; 72/42; 148/27; 501/20; 501/21
[58] Field of Search ............... 501/77, 15; 72/42

[56] References Cited

U.S. PATENT DOCUMENTS

| 3,140,779 | 7/1964 | Dalton et al. | 207/10 |
| 3,840,461 | 10/1974 | Espunes | 252/21 |
| 4,281,528 | 8/1981 | Spiegelberg et al. | 72/42 X |
| 4,291,107 | 9/1981 | Barry et al. | 501/15 |

FOREIGN PATENT DOCUMENTS

| 2422452 | 9/1979 | France . | |
| 50-54610 | 5/1975 | Japan | 501/77 |
| 52-25815 | 2/1977 | Japan | 501/77 |
| 829774 | 2/1956 | United Kingdom . | |
| 829775 | 2/1956 | United Kingdom . | |
| 860893 | 5/1957 | United Kingdom . | |
| 921086 | 3/1960 | United Kingdom . | |
| 896360 | 4/1960 | United Kingdom . | |
| 905989 | 4/1960 | United Kingdom . | |
| 921861 | 3/1963 | United Kingdom . | |
| 1089618 | 12/1964 | United Kingdom . | |
| 1094047 | 7/1965 | United Kingdom . | |
| 1032271 | 6/1966 | United Kingdom . | |
| 1168385 | 4/1968 | United Kingdom . | |
| 1124501 | 8/1968 | United Kingdom . | |
| 1125623 | 8/1968 | United Kingdom . | |
| 1299872 | 3/1970 | United Kingdom . | |
| 625816 | 9/1978 | U.S.S.R. | 72/42 |

OTHER PUBLICATIONS

Chemical Abstracts, vol. 87, 1977, p. 276, 87:57350q, (Japanese Published Patent Appln. 75/116322).
Chemisches Zentralblatt, vol. 209, 1964, Abstract No. 2007.

Primary Examiner—Helen M. McCarthy
Attorney, Agent, or Firm—Edward A. Steen; Francis J. Mulligan, Jr.; Raymond J. Kenny

[57] ABSTRACT

The coatings are glass compositions which consist essentially of from 18 to 45 mol % of the alkaline oxides CaO and one or both of $Na_2O$ and $K_2O$ and from 5 to 22 mol % of $Al_2O_3$, the balance being $B_2O_3$ and $SiO_2$ in such amounts that the molar ratio of $B_2O_3$: $(B_2O_3+SiO_2)$ lies in the range from 0.575:1 to 0.85:1. The molar ratio of $K_2O$: $(K_2O+Na_2O)$ is from 0.4:1 to 0.6:1 and CaO is 48 to 52 mole % of the alkaline oxides.

These compositions are particularly suitable for use during the heat-treatment and hot-working of titanium and its alloys.

4 Claims, 2 Drawing Figures

SINGLE PHASE GLASS COMPOSITIONS FOR USE IN PROTECTIVE AND LUBRICATING COATINGS FOR THE HEAT TREATMENT AND HOT WORKING OF METALS

TECHNICAL FIELD

This invention relates to glass compositions for use as protective and lubricating coatings in the heat treatment and hot forming of metals and alloys, which will be referred to hereafter as 'metals'. There is a particular need for compositions suitable for use in the heat treatment and hot working of titanium and titanium alloys.

A glass for this purpose should ideally fulfil a large number of requirements.

First, the glass should be capable of protecting the metal from oxidation during any heating-up or other heat treatment associated with the hot forming as well as during the working operation itself. This requires that the glass should form a substantially impermeable, adherent film on the metal, and should not react to any appreciable extent with the hot metal surface. Thus the molten glass should be fluid enough to wet the metal, but should not be reduced by the metal or any of its constituents, or change substantially in composition during prolonged heating in other ways, e.g. by volatilisation of one or more of its constituents. It should also not undergo devitrification during prolonged heating, as this would result in the film becoming porous and thus ceasing to protect the metal surface. Also, a devitrified film would not act as a lubricant.

However, the viscosity of the composition at the working temperature should not be so low that it runs off the workpiece or is squeezed out between the workpiece and the tool or die during working as this might lead to fretting or in an extreme case permanent welding between the tool or die and the workpiece.

In order to be useful for a range of metals requiring different working temperatures the temperature coefficient of viscosity of the molten glass should be low, i.e. the viscosity of the molten glass should not fall steeply as the temperature increases.

The glass should also readily sinter so that it can be applied as a slurry of solid particles in a medium that is then removed, e.g. by volatilisation or combustion.

BACKGROUND OF THE INVENTION

A variety of different compositions for use as protective and lubricating coatings for titanium and its alloys have been proposed. Most of them are based on silica and include such additives as boric oxide, alumina, zinc oxide, lead oxide and phosphorus pentoxide. For example, British Pat. No. 921 861 discloses silica ($SiO_2$) based glass compositions which also include boric oxide ($B_2O_3$), at least one of the alkaline earth metal oxides MgO, CaO and BaO, and either or both of the alkali metal oxides $Na_2O$ and $K_2O$, all in correlated ranges. It is observed in the description that a small quantity of alumina ($Al_2O_3$) may be added to the composition to increase its viscosity. A glass comprising 37 mol % $SiO_2$, 24 mol % $B_2O_3$, 9 mol % BaO, 28 mol % $K_2O$ and 2 mol % $Al_2O_3$ is given as an example.

It has however been found that these silicate-based (in molar terms) glasses tend to be rather soft at the temperatures at which titanium and its alloys are worked—typically in the range from 750° to 1050° C. depending upon the alloy composition. In addition, with the exception of the potentially toxic and therefore undesirable lead silicate based glasses, their surface tension tends to be high and therefore they may not easily wet the metal surface.

BRIEF DESCRIPTION OF THE INVENTION

The present invention is based on the discovery that borate-based glass compositions in which the relative proportions of the acidic oxides $B_2O_3$, $SiO_2$ and $Al_2O_3$ and the alkaline oxides $Na_2O$, $K_2O$ and CaO are carefully controlled have a combination of properties that make them suitable for use as protective and lubricating coatings for metals during heat treatment and hot working at temperatures in the range from about 750° C. to about 1050° C.

Accordingly, the present invention provides a glass composition consisting essentially of CaO and one or both of $Na_2O$ and $K_2O$ as alkaline oxides in a total amount of from 18 to 45 mol % and from 5 to 22 mol % of $Al_2O_3$, the balance being $B_2O_3$ and $SiO_2$ in such amounts that the molar ratio of $B_2O_3 : (B_2O_3 + SiO_2)$ is in the range from 0.575:1 to 0.85:1.

In glass compositions according to the invention, $Al_2O_3$ behaves, and is therefore referred to throughout, as an acidic oxide.

The glasses according to the invention have a low melting point and, in the molten state, form only a single liquid phase. This is desirable because if two or more liquid phases exist, the different components of the composition tend to be partitioned between them. This results in the different phases having markedly different viscosities and so the overall viscosity of the composition drops sharply. They have good wettability for, i.e. a small contact angle with, most metal surfaces including those of titanium and its alloys. They tend however not to wet chromium oxide, so dewetting may occur after prolonged contact with hot chromium-containing metals in oxygen-containing atmospheres as some oxygen will always diffuse through the glass composition to the metal surface where it will react with the chromium to form $Cr_2O_3$. It a substantial amount of the surface of the metal becomes covered with $Cr_2O_3$, dewetting may occur. In inert atmospheres however, there is insufficient oxygen available for the formation of $Cr_2O_3$ and in this situation glasses according to the invention have an advantage over glasses such as lead silicate-based glasses in which the chromium in the metal can, in the absence of atmospheric oxygen, reduce such an oxide in the glass to form $Cr_2O_3$.

The glasses generally have good resistance to devitrification on prolonged heating at elevated temperatures, although some decrease in vitreous stability may be found with compositions at or near the boundaries of the range specified above.

It is an important feature of the glasses of the invention that they are free from reducible oxides, for example PbO, CdO and SnO, from the toxic oxide BeO, and from oxides of other elements that may be deleterious to the properties of metals being worked, for example Bi, Tl, Se, Te, Sb, Sn, In, Ag, Hg, As, Ge, Ga, Zn, S and P.

It has also been found that the oxides of certain other elements which have been suggested for use in other glasses have an adverse effect on vitreous stability when present in more than impurity amounts. The compositions should therefore be substantially free of such oxides. These oxides include $ZrO_2$, $V_2O_5$, $TiO_2$, $La_2O_3$ and $Y_2O_3$.

Each of the constituents contributes to the combination of properties given above, and it is essential that their proportions are within the ranges set forth.

If the proportion of the alkaline oxides is reduced below 18 mol %, there is a tendency for compositions of high softening point (around 1200° C.) and poor vitreous stability to result. If the proportion of alkaline oxides is increased above 45 mol % compositions with a low melting point and undesirably high temperature coefficient of viscosity result. Such compositions often also show a tendency to crystalline melting (i.e. the liquid produced on melting of the solid has a low viscosity).

The alkaline oxides must be a mixture of either $Na_2O$ or $K_2O$ or both with CaO.

The presence of the alkaline earth metal oxide CaO is necessary to ensure that the glasses have an acceptable softening temperature, but, if it is used as the only, alkaline oxide, immiscible phases may be formed. Preferably the CaO forms about 50 mol % of the alkaline oxides, for example from 48 to 52 mol %.

Whereas one might expect that it would be possible to substitute one of the other alkaline earth metal oxides for all or part of the CaO, in practice this does not work in borate-based glasses. We find that replacing more than a small amount of the CaO by MgO or SrO decreases the vitreous stability markedly. The other alkaline earth metal oxide BaO is toxic to humans and reacts with some hot metals. It is therefore not suitable for inclusion in a glass composition which is to be used as a protective coating or lubricant for hot metals. For these reasons the composition should be substantially free of these oxides.

The presence of the alkali metal oxides $Na_2O$ and $K_2O$ in the composition removes regions of liquid-liquid immiscibility, although the softening temperature of the glasses is reduced. It is preferably to have both $Na_2O$ and $K_2O$ present, as the increased complexity of the composition also helps to increase the stability of the glass. Advantageously the molar ratio of $K_2O$ to $(K_2O + Na_2O)$ is in the range from 0.4:1 to 0.6:1, and conveniently equimolar proportions of the two oxides may be used. Whereas it might be possible to substitute small amounts of the other alkali metal oxides for the sodium or potassium oxides, we prefer to use these latter oxides because they are much less expensive and more freely available than the others.

Of the three acidic oxides $B_2O_3$ is the main contributor to low viscosity and small contact angle, but its melting point is too low for it to be useful as the sole acidic oxide at temperature above 450° C. The presence of the other acidic oxides $Al_2O_3$ and $SiO_2$ serves to raise the useful temperature range, as does that of the basic oxides.

the $Al_2O_3$ content of the composition must lie in the range from 5 to 22 mol %. Compositions containing less than 5 mol % tend to have low melting points and high temperature coefficients of viscosity and there may even be poor miscibility in the melt. If the $Al_2O_3$ content is increased above 22 mol %, compositions with high melting points and poor vitreous stability may result.

An increase in silica content which results in the molar ratio of $B_2O_3:(B_2O_3+SiO_2)$ falling below 0.575:1 may result in compositions having poor wettability. On the other hand, if the ratio exceeds 0.85:1 there will be a tendency for the composition of the glass to change rapidly owing to volatilisation of $B_2O_3$.

Glasses according to the invention may, depending on their composition, be used to protect and work metals at temperatures in part or all of the range 750° to 1050° C. Metals that may be worked in this temperature range include metallic titanium, high titanium alloys (i.e. alloys containing at least 70% Ti) such a IMI Titanium 318, 315, 679 and 685, and iron- and nickel-based alloys, the exact temperature and the working conditions depending upon the alloy composition, the shape and the size of the component being produced, and the type of forming operation employed.

The glasses may be used as lubricants in a wide range of hot-working operations, including extrusion, forging, coining and superplastic forming.

They are particularly useful for working metals that tend to form a hardened surface layer during working by diffusion of oxygen from the atmosphere, as they serve to protect the surface from this attack as well as providing lubrication. The need to remove the hardened surface layer, e.g. by chemical polishing, is thus greatly reduced, so that it is possible to perform the hot-working to closer tolerances. This is particularly valuable in the production of small blades or vanes for gas turbines and similar articles which are not easy to adjust to size after working.

PREFERRED EMBODIMENTS OF THE INVENTION

For the particular purpose of hot-working titanium and its alloys, it has been found that compositions having especially desirable properties lie in two ranges within the broad composition ranges specified above. The properties concerned are the viscosity which should be of the order of $10^4$ poise at the working temperature of 900°–10000° C., the vitreous stability which should be at least 1 hour at the working temperature for hot-working and at least 5 hours at the working temperature for heat-treatment, and the temperature coefficient of viscosity i.e. the rate of change of viscosity with temperature. This is measured as $$\frac{\log \epsilon}{1000/T}$$

where $\epsilon$ is viscosity in poise and T is temperature in °C., and should ideally be as low as possible. In practice, the maximum permissible value is about 1.0. This allows a fluctuation band of about 50° C. around the working temperature.

The invention will now be described in more detail with reference to the accompanying drawings.

FIG. 1 is a graph showing the relationship between the molar percentage of alkaline oxides and molar percentage of $Al_2O_3$. Glasses according to the invention have an alkaline oxide and $Al_2O_3$ content which lie in the area ABCD. The two preferred ranges of composition are shown as X and Y and have the following alkaline oxide and $Al_2O_3$ contents:

| Range | $Al_2O_3$ content (mol %) | Alkaline oxide content (mol %) |
|---|---|---|
| X | 19 to 21 | 19 to 22 |
| Y | 10 to 20 | 30 to 35 |

For both ranges, the ratio $B_2O_3:(B_2O_3+SiO_2)$ is from 0.575 to 0.85.

Table 1A below shows the composition in mol % of five glasses A to E according to the invention, and by way of comparison, the composition of a commercially available lead silicate glass F. (For convenience, Table 1B gives the equivalent values in weight percent.)

TABLE 1A (mole %)

| Glass | $B_2O_3$ | $Al_2O_3$ | $SiO_2$ | $Na_2O$ | $K_2O$ | CaO | PbO | $\dfrac{B_2O_3}{B_2O_3 + SiO_2}$ |
|---|---|---|---|---|---|---|---|---|
| A | 45 | 20 | 15 | 5 | 5 | 10 | — | 0.75 |
| B | 38 | 11 | 19 | 8 | 8 | 16 | — | 0.67 |
| C | 40 | 20 | 20 | 5 | 5 | 10 | — | 0.67 |
| D | 35 | 20 | 25 | 5 | 5 | 10 | — | 0.58 |
| E | 46.8 | 17.5 | 15.7 | 5 | 5 | 10 | — | 0.75 |
| F | 5 | 2 | 69 | 6 | 6 | 2 | 10 | 0.07 |

TABLE 1B (weight %)

| Glass | $B_2O_3$ | $Al_2O_3$ | $SiO_2$ | $Na_2O$ | $K_2O$ | CaO | PbO | $\dfrac{B_2O_3}{B_2O_3 + SiO_2}$ |
|---|---|---|---|---|---|---|---|---|
| A | 46 | 14 | 18 | 6 | 4 | 13 | — | 0.72 |
| B | 37 | 8 | 22 | 9 | 5 | 19 | — | 0.63 |
| C | 40 | 14 | 23 | 6 | 4 | 13 | — | 0.63 |
| D | 35 | 14 | 29 | 6 | 3 | 13 | — | 0.65 |
| E | 47 | 12 | 18 | 6 | 4 | 13 | — | 0.72 |
| F | 5 | 1 | 77 | 7 | 4 | 3 | 3 | 0.06 |

It will be seen that glasses A, C and D lie in range X and glass B lies in range Y. Of the glass compositions A to E, compositions A and B are particularly preferred. In particular, composition A is suitable for use with IMI Titanium 315 which is typically worked in the temperature range 750° to 850° C.

Glasses A to E were made by mixing together appropriate amounts of calcium oxide, sodium and potassium hydroxides (to form the oxides), aluminum hydroxide (to form the oxide), silica in the form of silica flour and vitreous granules of boric oxide. These constituents were melted together in a plumbago crucible which had previously been lined with a glass of similar composition. The crucible was heated until a clear mobile liquid was formed—in all cases this happened at a temperature in the range from 1200°–1300° C. The liquid was poured into a chilled cast iron mould and the resulting glass was crushed, remixed and remelted to eliminate any segregation and incomplete dissolution in the first cast glass. Tests were then carried out on glasses A to E to determine the vitreous stability, temperature coefficient of viscosity at 950° C., and the temperature at which the desired viscosity of $10^4$ poise was reached. Similar tests were carried out on glass F which is available commercially as JRS9A from C. E. Ramsden & Co. Ltd.

Figure 2:
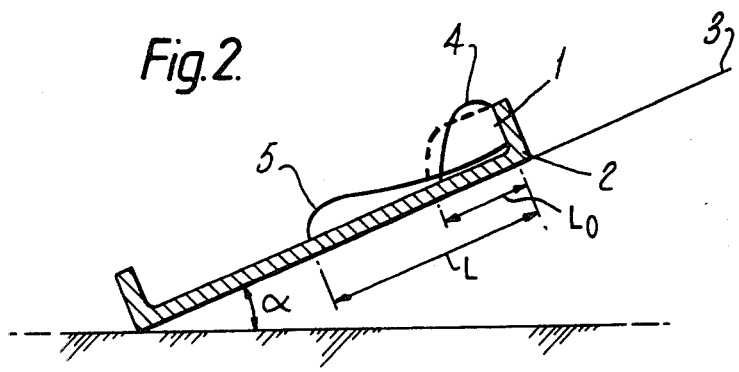

The measurement of viscosity will now be described with reference to FIG. 2 of the accompanying drawings. The Figure shows schematically the apparatus used and the measurements made. 1 g of the composition in the form of packed glass frit 1 was put in one end of a combustion boat 2 and the boat was put on a ramp 3 inclined at an angle α to the horizontal. The assembly was put in a furnace (not shown) for 200 s to allow the glass to melt whereafter the length Lo of the melted glass drop 4 was measured. The assembly was returned to the furnace for 2500 s to allow the melted glass to flow, and then the length L of the flowed glass drop 5 was measured. The viscosity of the glass was calculated using the equation:

$$\epsilon = \dfrac{K}{\Lambda + \dfrac{1}{1.9}(n(1 + 10e^{-1.9}) - C}$$

where:

$$\Lambda = \dfrac{L}{Lo}$$

$C = 1.48134$ $$K = \dfrac{2e^{-2}M^2 \, tg \sin\alpha}{pw^2 Lo^3} \quad (\sin\alpha = 0.4)$$

M = mass of glass
p = density of glass (Taken to be 2.30 g/cm³)
tg = flow time
w = width of channel in combustion boat The onset of devitrification was detected by eye and defined as the stage at which the surface of the melted glass lost its glossy appearance and assumed a matte, slightly granular appearance.

The results of the tests are shown in Table 2 below.

TABLE 2

| Glass | Temperature coefficient of viscosity | Vitreous stability (hours) | Temperature at which $\epsilon = 10^4$ (°C.) |
|---|---|---|---|
| A | 0.65 | +20 | 925 |
| B | 0.5 | +10 | 950 |
| C | 0.7 | +20 | 960 |
| D | 0.6 | +20 | 960 |
| E | 0.55 | +1 | 960 |
| F | 0.45 | +1 | 975 |

From this table its can be seen that all the glasses according to the invention had properties at least comparable to those of the commercially available lead silicate glass F without its drawback of toxicity. Indeed, the vitreous stabilities of glasses A to D, which all lie within one or other of the preferred ranges X and Y, are markedly superior to that of glass F.

A commercial alternative to the experimental mix, melt, cast, grind, remix and remelt procedure described above is to melt the ingredients in a rotary kiln. As an alternative to casting and grinding, the molten glass may be fragmented by pouring it into cold water.

Glasses according to the invention may conveniently be applied to the surface of the metal workpiece as a paint comprising a slurry or suspension in a liquid medium. For this purpose the glass composition should be fragmented to a particle size of from 20 to 30 μm. The particles are then suspended in a suitable liquid, for example an aqueous emulsion of a vinyl acrylic polymer or a solution or dispersion of an acrylic resin in an organic solvent, e.g. xylene. Aqueous-based emulsion paint systems are preferred, because they are both cheaper and also less flammable and toxic. The particles may be crushed and ball-milled dry before mixing with the paint base or alternatively they may be milled into the paint base.

The paint may have a glass:polymer ratio (by weight) of from 5:1, where high mechanical strength of the paint film is required, to 25:1 where the generation of smoke on burning off the polymer is undesirable. The paint may also contain a thickening agent, e.g. methyl-cellulose, to prevent settling of the glass particles during storage. This is particularly desirable with high glass-:polymer ratios.

The paint should be of such a consistency that it may readily be applied to the metal surface, e.g. by spraying or dip-coating to form an even coating that will not drip off too quickly. The coating may then be air-dried and heated to burn off the polymer or resin, leaving a layer of the glass particles which sinter to form a continuous film on the metal surface.

Glass remaining on the surface of the metal after working may readily be removed by means of a nitric acid-based descaling solution e.g. that sold under the trade name "Nitrad". Optionally the metal may be pretreated by barrelling or tumbling to remove heavy deposits.

An aqueous solution of 1 Molar HCl, which may contain a small proportion, e.g. 0.05 M, of fluoride ions to remove any silica-rich deposit, may be used for corrosion-resistant substrates such as Alloy 318 or titanium metal.

The invention specifically includes the use of glass compositions as described above as protective and lubricating coatings in the heat treatment and hot-forming of metals and alloys.

I claim:

1. A glass composition which in the molten state forms only a single liquid phase and is suitable for use as a protective and lubricating coating in the heat treatment and hot forming of metals and alloys, the composition consisting essentially of the following alkaline oxides, CaO, $Na_2O$ and $K_2O$ and the following acidic oxides, $B_2O_3$, $SiO_2$ and $Al_2O_3$, the composition consisting essentially of the alkaline oxides in a total amount of from 18 to 45 mol %, from 5 to 22 mol % of $Al_2O_3$, the molar ratio of $K_2O:(K_2O+Na_2O)$ in the range from 0.4:1 to 0.6:1, 48 to 52 mol % of the alkaline oxides being CaO, and the balance being $B_2O_3$ and $SiO_2$ in the molar ratio of $B_2O_3:(B_2O_3+SiO_2)$ in the range from 0.575:1 to 0.85:1.

2. A composition according to claim 1 wherein the $Al_2O_3$ content lies in the range from 19 to 21 mol % and the alkaline oxide content lies in the range from 19 to 22 mol % said glass having a log viscosity of about 4 poise at the working temperature of 900°–1000° C.

3. A composition according to claim 1 wherein the $Al_2O_3$ content lies in the range from 10 to 20 mol % and the alkaline oxide content lies in the range from 30 to 35 mol % said glass having a log viscosity of about 4 poise at the working temperature of 900°–1000° C.

4. A composition as claimed in claim 1 which comprises (in mol %), 45% $B_2O_3$, 20% $Al_2O_3$, 15% $SiO_2$, 5% $Na_2O$, 5% $K_2O$ and 10% CaO.

* * * * *